United States Patent [19]

Shiets

[11] Patent Number: 5,966,812
[45] Date of Patent: Oct. 19, 1999

[54] METHOD OF REPAIRING VEHICLE AXLE HOUSINGS

[76] Inventor: Leo C. Shiets, 20755 N. Dixie Hwy., Bowling Green, Ohio 43402

[21] Appl. No.: 08/857,139

[22] Filed: May 15, 1997

[51] Int. Cl.[6] .................................................. B23P 15/00
[52] U.S. Cl. ................. 29/897.1; 29/402.16; 29/402.09; 29/402.21; 29/402.13
[58] Field of Search ........................... 29/402.09, 402.11, 29/402.13, 402.16, 402.19, 402.21, 897.1

[56] References Cited

U.S. PATENT DOCUMENTS

| | | | |
|---|---|---|---|
| 1,739,119 | 12/1929 | Blakeslee . | |
| 1,900,682 | 3/1933 | Alcott . | |
| 2,660,778 | 12/1953 | Gerner | 29/148 |
| 3,725,635 | 4/1973 | Fink et al. | 219/121 P |
| 3,852,872 | 12/1974 | Afanador et al. | 29/447 |
| 4,050,140 | 9/1977 | Newell | 29/401 B |
| 4,069,573 | 1/1978 | Rogers, Jr. et al. | 29/421 R |
| 4,074,412 | 2/1978 | Miskic | 29/401 E |
| 4,377,894 | 3/1983 | Yoshida | 29/421 R |
| 4,455,732 | 6/1984 | Shiets | 29/402.06 |
| 4,571,795 | 2/1986 | Shiets | 29/26 B |
| 4,792,080 | 12/1988 | Ferrari | 228/49.3 |
| 4,844,322 | 7/1989 | Flowers et al. | 228/119 |
| 4,997,321 | 3/1991 | Adams | 408/80 |

*Primary Examiner*—David P. Bryant
*Assistant Examiner*—Marc W. Butler
*Attorney, Agent, or Firm*—Brinks Hofer Gilson & Lione

[57] ABSTRACT

A method of repairing a vehicle axle housing comprising the steps of enlarging a center passageway in the axle housing by, for example, boring, providing a stepped elongate sleeve having an outside diameter greater than the diameter of the enlarged center passageway of the axle housing, heating the axle housing to further enlarge the center passageway, inserting the sleeve in the center passageway and securing by, for example, welding, the sleeve to the axle housing. Typically, the axle housing will be broken into two sections and the above steps will be performed on the sections as well an additional step relating to trimming, by grinding or other suitable process, the opposed ends of the axle housing sections adjacent the fracture.

18 Claims, 4 Drawing Sheets

5,966,812

METHOD OF REPAIRING VEHICLE AXLE HOUSINGS

BACKGROUND OF THE INVENTION

The invention relates generally to a method of repairing vehicle axle housings and more specifically to a method of repairing axle housings for large vehicles and heavy equipment which fracture into two sections generally along a plane perpendicular to the axis of the axle housing.

The drive line components of large trucks and particularly off road vehicles, such as construction and earth moving equipment, are well designed, massive and thus expensive. Notwithstanding careful design and massive execution, the drive line components of such vehicles and equipment such as prop shafts, axles, bearings and housings for these components are subjected to service which can only be described as rough and oftentimes accurately described as brutal. Hence, such components occasionally fail. Accompanying such failure is frequently an extended period of downtime. The obvious cost associated with such breakdown is that of the actual replacement part and the service time necessary to remove and replace it which, because of their relative rarity, will be significant. An even greater expense may accrue not from the actual repair but rather from the downtime from having such a machine out of service for a even a few days. It is against this background that the present inventor has sought approaches which minimize both actual repair expense and the expense associated with vehicle downtime.

The reconstruction of failed or broken vehicle components is addressed in the prior art. For example, U.S. Pat. No. 1,739,119 to Blakeslee teaches a method of reclaiming automobile axles. A similar repair method relating to drive line bell housings is disclosed in U.S. Pat. No. 2,660,778 to Gerner.

My U.S. Pat. No. 4,455,732 teaches a method of repairing the damaged ends of vehicle axles. U.S. Pat. Nos. 4,844,322 to Flowers et al. and 4,997,321 to Adams both teach methods of repairing sections of elongate articles such as piping or tubing.

From the foregoing patents, it is apparent that many aspects of vehicle axle repair have been addressed. However, the specific difficulties of repairing, for example, an axle configuration having a drive shaft extending therethrough have neither been addressed nor resolved. Hence, improvements in the art of vehicle axle repair are both possible and desirable.

SUMMARY OF THE INVENTION

A method of repairing a vehicle axle housing comprises the steps of enlarging a center passageway in the axle housing by, for example, boring, providing an elongate sleeve having an outside diameter greater than the diameter of the enlarged center passageway of the axle housing, heating the axle housing to further enlarge the center passageway, inserting the sleeve in the center passageway and securing by, for example, welding, the sleeve to the axle housing. Typically, the axle housing will be fractured into two sections and the above steps will be performed on both sections with an additional step relating to trimming, by grinding or other suitable method, the opposed ends of the axle housing sections adjacent the fracture.

It is thus an object of the present invention to provide a method for repairing vehicle axle housings.

It is a further object of the present invention to provide a method of repairing heavy duty vehicle axle housings which involves repair rather than replacement of the failed axle housing.

It is a still further object of the present invention to provide a method of repairing motor vehicle axle housings which encompasses machining steps such as boring and grinding.

It is a still further object of the present invention to provide a method of repairing axle housings for large vehicles and heavy equipment which fracture into two sections generally along a plane perpendicular to the axis of the axle housing.

Further objects and advantages of the present invention will become apparent by reference to the following description of the preferred embodiment and appended drawings wherein like reference numbers refer to the same element, component or feature.

DESCRIPTION OF THE PREFERRED EMBODIMENT

Figure 1:
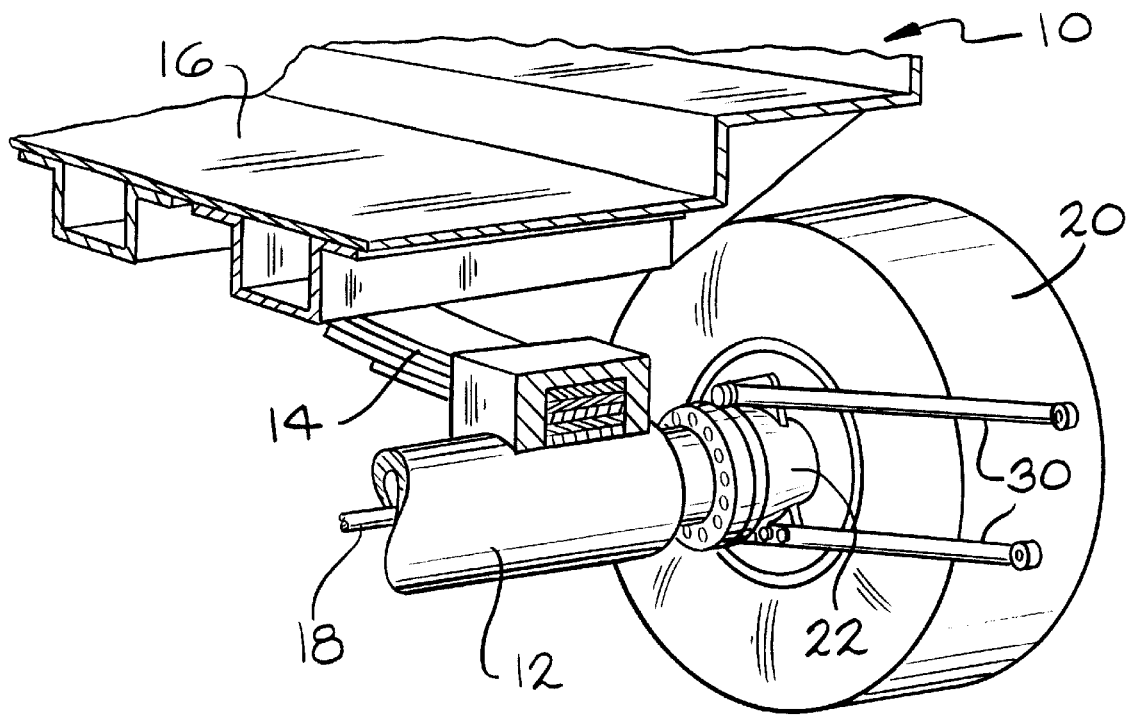
FIG. 1 is fragmentary, perspective view of a heavy duty motor vehicle axle and housing to which the present method is directed.

Referring now to FIG. 1, a large, heavy-duty motor vehicle is illustrated and generally designated by the reference numeral 10. The heavy-duty motor vehicle 10 may be a large truck or construction or earth moving equipment such as a grader, front end loader or the like. As such, the motor vehicle 10 includes a center axle housing 12 which supports, through suspension components 14, a frame or body portion 16. The center axle housing 12 typically also includes a concentrically disposed drive shaft 18 which is coupled through a suitable drive assembly (not illustrated) to a tire and wheel assembly 20. Disposed generally at the end of the center axle housing 12 is a conical or bell shaped axle housing 22.

The conical axle housing 22 preferably includes a flange 24 having a plurality of through apertures 26 arranged in a bolt circle to receive fasteners (not illustrated) for attaching the conical axle housing 22 to the center axle housing 12. The conical axle housing 22 may also include lugs or ears 28 which may receive various suspension or, alternatively, steering components 30. The conical axle housing 22 includes a circumferential flat or oil seal surface 34 against which an oil seal (not illustrated) may rest and a wider circumferential bearing surface 36 upon which bearing assemblies (not illustrated) may be placed to support the tire and wheel assembly 20. The conical axle housing 22 may also may include a splined region 38 which cooperate with the drive assembly of the tire and wheel assembly 20.

Figure 2:
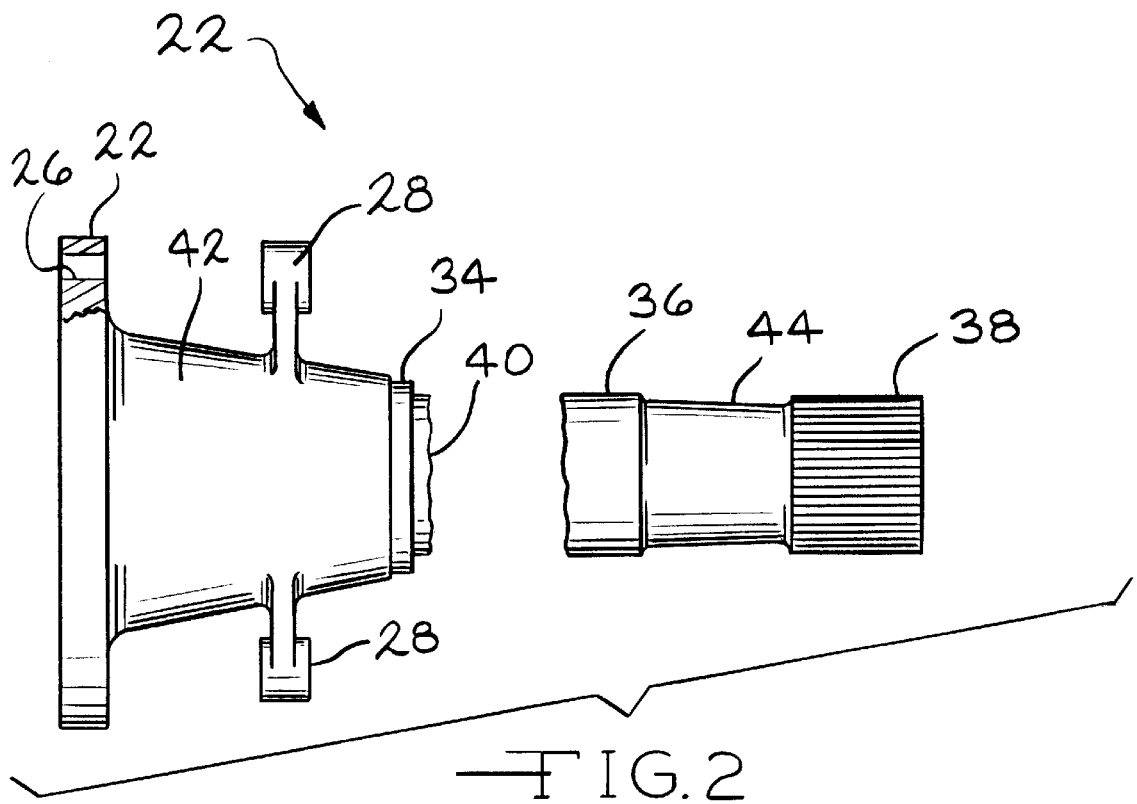
FIG. 2 is a side, elevational view of a motor vehicle axle housing fractured into two sections.

As illustrated in FIG. 2, a stress fracture of the conical axle housing 22 has occurred along a line of fracture 40 and the conical axle housing 22 has been severed or fractured into a first section 42 which includes the flange 24 and the lugs 28 and a second section 44 which includes the majority of the bearing surface 36 and the splined region 38.

Figure 3:
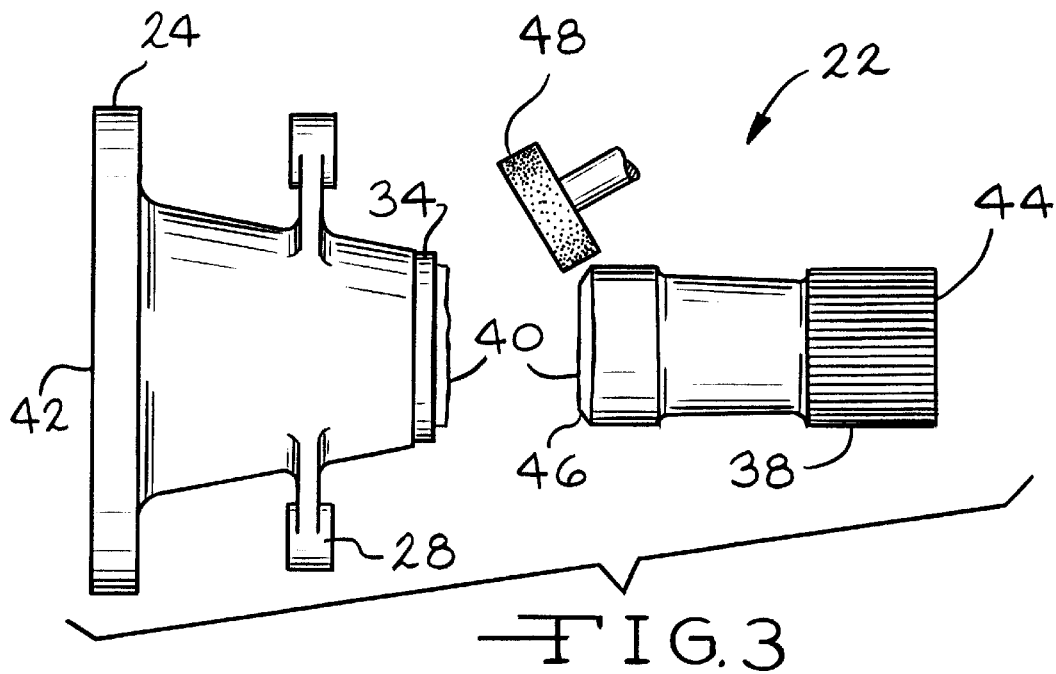
FIG. 3 is a side, elevational view of the two sections of a fractured motor vehicle axle housing wherein the first repair step of trimming and grinding down sharp corners adjacent the fracture is illustrated.

Turning now to FIG. 3, the circumferential edge adjacent regions of the first section 42 and of the second section 44 adjacent the fracture 40 are first filed, ground or abraded to a relatively smooth, chamfered frusto-conical surface 46 through the use of a grinding wheel 48 or similar tool such as a file or other abrading or material removing instrumentality. In FIG. 3, for purposes of clarity and comparison, only the second section 44 has been ground down but it is to be understood that the opposing region of the first section 42 will be ground in a corresponding fashion during this step.

Figure 4:
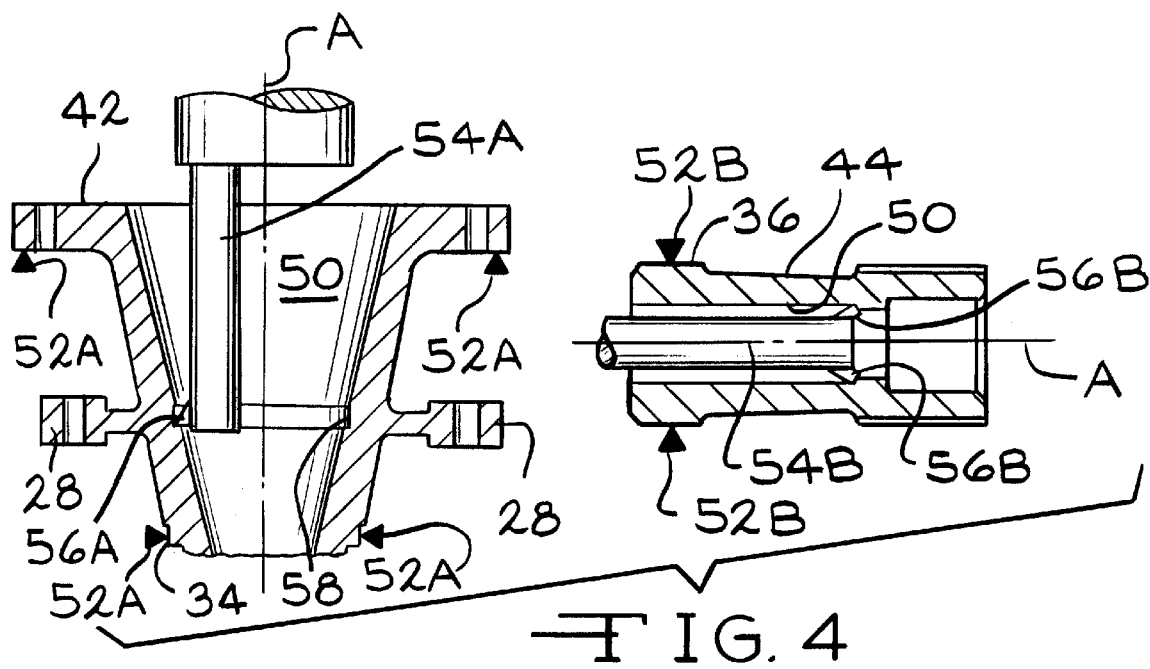
FIG. 4 is a full, sectional view of the two sections of the motor vehicle axle housing illustrating the boring of the center passageway in each section.

Referring now to FIG. 4, a boring operation is undertaken to enlarge a central passageway 50 which extends concentrically along a center axis A of the first section 42 and the second section 44. Specifically, the first section 42 is placed upon a jig or appropriate supports of a boring machine (not illustrated) represented schematically by the registration points 52 and secured there. A boring bar 54A and associated drive mechanism (not illustrated) is positioned on the center axis A defined by the oil seal surface 34 and translated into the first section 42 such that the boring bar 54A and a cutter 56A associated therewith accurately enlarges the preexisting center passageway 50 such that a straight walled shoulder region 58, concentric with the axis of the oil seal surface 34 is formed.

In a similar fashion, the second section 44 is positioned in a jig or appropriate supports represented schematically by the registration pins 52B of a boring machine (also not illustrated) such that the axis of a boring tool 54B and a pair of cutters 56B are concentric with the axis defined by the bearing surface 36 and the center axis A. Here, the boring bar 54B and the cutters 56B are translated along the full length of the center passageway 50, enlarging it on the center axis A which is concentric with the axis of the bearing surface 36 and coaxial with the axis A of the first section 42. At the conclusion of the step illustrated in FIG. 4, the center passageway 50 in the first section 42 has the shoulder region 58 bored therein by the boring bar 54A on the cutter 56A and the center passageway 50 in the second section 44 has been enlarged to a uniform diameter by the pair of cutters 56B of the boring bar 54B along an axis A concentric with the oil seal surface 34 of the first section 42. Thus, the bearing surface 34 and the shoulder region 58 of the first section 42 and bearing surface 36 and the enlarged center passageway 50 of the second section 44 are all coincident with the center axis A of the two sections 42 and 44.

Figure 5:
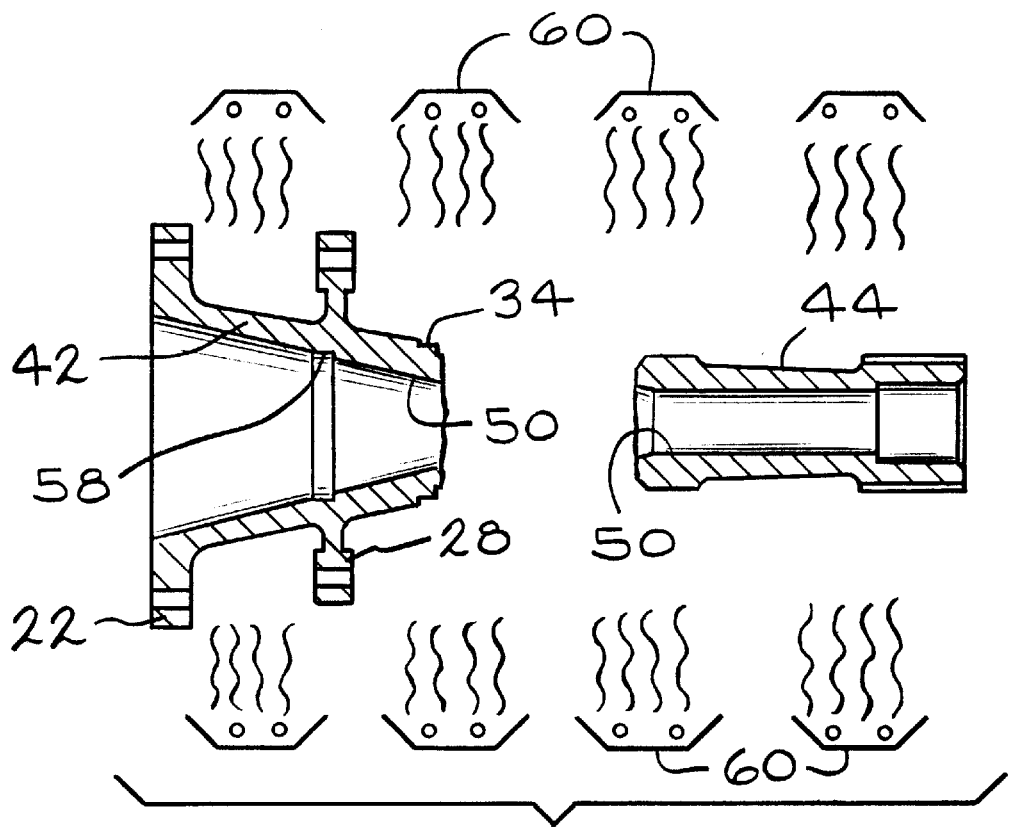
FIG. 5 is a diagrammatic view of the two sections of the motor vehicle axle housing being heated to enlarge the center passageway.

Turning now to FIG. 5, the first section 42 and the second section 44 are disposed within a suitable heating appliance such as an oven having convection or infrared heating elements 60. Alternatively the sections 42 and 44 may be similarly heated by placing in an induction heating device. In either event, the temperature of the first section 42 and of the second section 44 is uniformly raised to approximately 300° F. (150° C.) and in any event in the range of from about 275° F. (135° C.) to 350° F. (177° C.) and at least a temperature high enough that, given the thermal coefficient of expansion of the material, the inside diameter of the center passageway 50 and the shoulder region 58 enlarge to respective diameters greater than the nominal outside diameter of components to be installed therein. As those familiar with thermal expansion of metal will readily understand, all the dimensions of the sections 42 and 44 will enlarge, including the diameters of the center passageway 50 of the second section 44 and of the shoulder region 58 of the first section 42.

Figure 6:
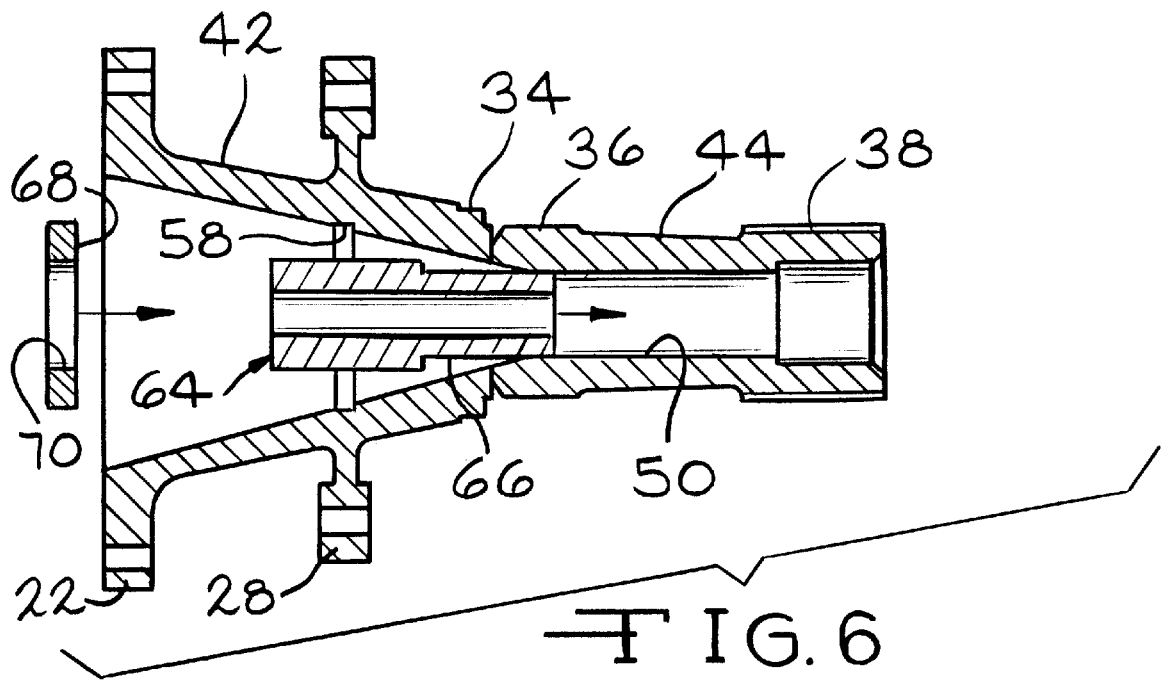
FIG. 6 is a full, sectional view of the two sections of the motor vehicle axle housing reassembled with a stepped, elongate sleeve partially disposed within the center passageway.

Turning now to FIG. 6, in the heated state achieved in the process step of FIG. 5, the first section 42 and the second section 44 are juxtaposed such that the center axes A of each section are aligned and an elongate, preferably hollow, stepped sleeve 64 is provided. The hollow, stepped sleeve 64 includes a smaller diameter end region 66. The smaller diameter end region 66 of the sleeve 64 is inserted through the first section 42 and seated within the enlarged passageway 50 of the second section 44. The exterior diameter of the end region 66 of the elongate sleeve 64 is preferably slightly larger, on the order of 0.008 inches (0.20 mm.), than the diameter of the center passageway 50 of the second section 44 when this section is at ambient, i.e., unelevated, temperature. Depending on variables such as the overall size of the axle housing 24 and the type of materials, the interference fit between the center passageway 50 and the end region 66 of the sleeve 64 may be increased or decreased by as much as 50%. Obviously, therefore, the heating required during the step illustrated in FIG. 5 must be sufficient to enlarge the inside diameter of the center passageway 50 to a diameter somewhat larger than the outside diameter of the end region 66 of the sleeve 64, in this case at least 0.008 inches and preferably somewhat larger, in order that it may freely and readily receive the end region 66 of the elongate sleeve 64.

Also at this time, a collar 68 having an inside diameter 70 just slightly larger than the outside diameter of the larger portion of the elongate sleeve 64 is slid over the end of the sleeve 64 in the first section 42 and positioned snugly against the straight walled shoulder region 58.

As the first and second sections 42 and 44 cool and thus return to their nominal, ambient temperature dimensions, they tightly grip and retain the elongate sleeve 64 due to the interference fit described above.

Figure 7:
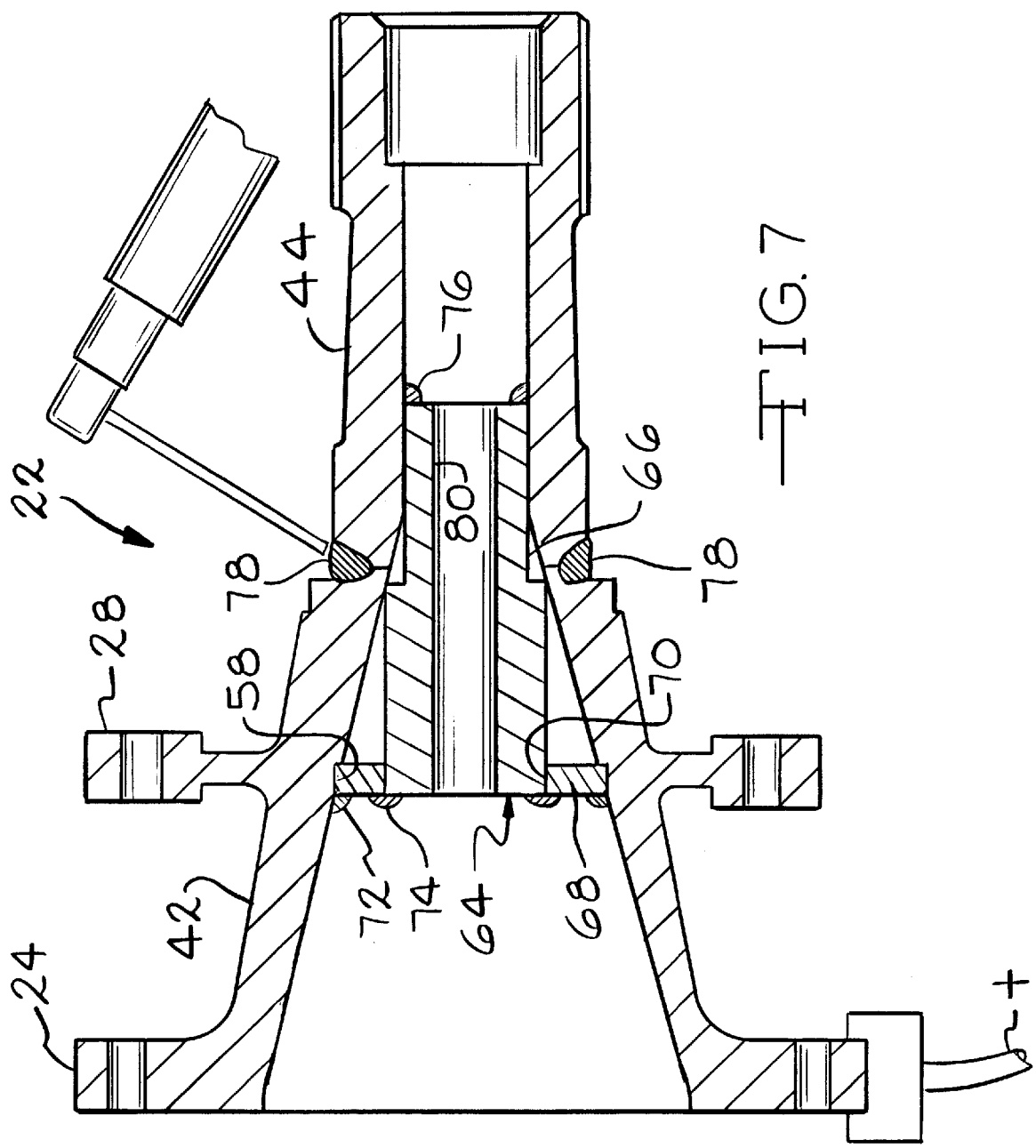
FIG. 7 is a full, sectional view of a fully reassembled motor vehicle axle housing, sleeve and collar with weldments.

Turning now to FIG. 7, the reconstruction of the axle housing 24 is nearly complete. The final step illustrated in FIG. 7 comprehends welding the collar 68 to the interior surface of the first section 42 and to the elongate sleeve 64 by providing circular weldments 72 and 74, respectively providing a circular weldment 76 to secure the opposite end of the elongate sleeve 64 to the other end of the center passageway 50 within the second section 44 and finally to provide a circular weldment 78 around the chamfered surfaces 46 disposed adjacent the original fracture 40 (See FIG. 3). This step completes the reconstruction of the axle housing 24 and it may be reassembled to the vehicle 10 through reattachment and securement of the fasteners and suspension components associated with the flange 24 and webs 28, respectively.

Optionally, and depending upon the degree of interference fit between the end region 66 of the elongate sleeve 64 and the enlarged center passageway 50 in the second section 42, it may be necessary to reduce the diameter of the bearing surface 36 slightly in order to accommodate the inside diameter of standard bearings. Reduction in the diameter of the bearing surface 36 may readily be achieved by, for example, utilizing the technology disclosed in my U.S. Patent No. 4,098,029 which is hereby incorporated by reference.

It will be appreciated that the elongate sleeve 64 includes a center passageway 80 which is sized to accommodate a drive shaft such as the drive shaft 18 which may be utilized to provide motive energy to the tire and wheel assembly 20.

The foregoing disclosure is the best mode devised by the inventor for practicing this invention. It is apparent, however, that methods incorporating modifications and variations will be obvious to one skilled in the art of vehicle component repair. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A method of repairing a vehicle axle housing comprising the steps of:

enlarging portions of a center passageway of the axle housing to first and second diameters, providing an elongate sleeve having an outside diameter greater than the first diameter, providing a collar having an outside diameter greater than the second diameter for centering said elongate sleeve in the second diameter of the center passageway, heating the axle housing to enlarge the portions of the center passageway to respective diameters greater than the diameters of the elongate sleeve and the collar, inserting the sleeve and collar in the enlarged portions of the center passageway and welding the sleeve and collar to the axle housing.

2. The method of repairing a vehicle axle housing of claim 1 further including the step of providing the elongate sleeve with a through axial passageway.

3. The method of repairing a vehicle axle housing of claim 1 further including the step of fracturing the axle housing into two sections.

4. The method of repairing a vehicle axle housing of claim 3 further including the step of trimming each of the axle housing sections adjacent the fracture.

5. The method of repairing a vehicle axle housing of claim 1 wherein said enlarging step is achieved by centering a boring machine boring bar on an oil seal or bearing surface.

6. A method of repairing a vehicle axle housing fractured into two sections comprising the steps of:

enlarging a center passageway of one of said sections to a first diameter, enlarging a portion of a center passageway of another of said sections to a second diameter, providing an elongate, hollow sleeve having an outside diameter greater than the first diameter, providing a collar having an outside diameter greater than the second diameter, heating the sections of the axle housing to enlarge the respective center passageways to diameters greater than the diameters of the elongate sleeve and the collar, inserting the sleeve and collar into the center passageway of the respective sections of the axle housing and securing the sleeve and collar to the respective sections of the axle housing.

7. The method of repairing a vehicle axle housing of claim 6 further including the step of providing the elongate sleeve with a through axial passageway.

8. The method of repairing a vehicle axle housing of claim 6 wherein said elongate sleeve defines regions of two distinct diameters.

9. The method of repairing a vehicle axle housing of claim 8 further including the step of trimming each of the axle housing sections adjacent the fracture.

10. The method of repairing a vehicle axle housing of claim 6 wherein said enlarging step is achieved by centering a boring machine boring bar on an oil seal or bearing surface.

11. The method of repairing a vehicle axle housing of claim 6 wherein the outside diameter of the elongate sleeve is 0.004 to 0.012 inches larger than the reference diameter.

12. The method of repairing a vehicle axle housing of claim 6 further including the step of providing a collar and disposing the collar about the sleeve and securing the collar to the housing.

13. A method of repairing a vehicle axle housing comprising the steps of enlarging a first portion of a center passageway in the axle housing to a first reference diameter, enlarging a second portion of the center passageway in the axle housing to a second reference diameter, providing an elongate sleeve having an outside diameter greater than the first reference diameter, providing a collar having an outside diameter greater than the second reference diameter and an inside diameter slightly larger than the outside diameter of the elongate sleeve, heating the axle housing to enlarge the first and second portions of the center passageway to respective diameters greater than the outside diameters of the elongate sleeve, and the collar, inserting the elongate sleeve in the first portion of the center passageway and positioning the collar in the second portion of the center passageway and on the elongate sleeve and welding the collar to the sleeve and axle housing and welding the sleeve to the axle housing.

14. The method of repairing a vehicle axle housing of claim 13 further including the step of fracturing the axle housing into two sections.

15. The method of repairing a vehicle axle housing of claim 14 further including the step of trimming each of the axle housing sections adjacent the fracture.

16. The method of repairing a vehicle axle housing of claim 13 further including the step of providing the elongate sleeve with a through axial passageway.

17. The method of repairing a vehicle axle housing of claim 13 wherein the outside diameter of the elongate sleeve is 0.004 to 0.012 inches larger than the reference diameter.

18. The method of repairing a vehicle axle housing of claim 13 wherein said enlarging step is achieved by centering a boring machine boring bar on an oil seal or bearing surface.

* * * * *